United States Patent
Sweeten et al.

(10) Patent No.: US 9,880,397 B1
(45) Date of Patent: Jan. 30, 2018

(54) CORRECTIVE LENS ADAPTER FOR FIREARM SCOPE

(71) Applicants: Danney E. Sweeten, Montgomery, TX (US); Sharon Sweeten, Montgomery, TX (US)

(72) Inventors: Danney E. Sweeten, Montgomery, TX (US); Sharon Sweeten, Montgomery, TX (US)

( * ) Notice: Subject to any disclaimer, the term of this patent is extended or adjusted under 35 U.S.C. 154(b) by 504 days.

(21) Appl. No.: 14/134,654

(22) Filed: Dec. 19, 2013

Related U.S. Application Data

(60) Provisional application No. 61/891,150, filed on Oct. 15, 2013.

(51) Int. Cl.
*G02C 7/00* (2006.01)
*G02C 5/00* (2006.01)

(52) U.S. Cl.
CPC .................... *G02C 5/003* (2013.01)

(58) Field of Classification Search
CPC .......... G02C 5/003; G02C 7/16; G02C 7/086; G02C 7/105; G02C 5/001; G02C 5/006; G02C 7/104; G02C 7/165; G02C 9/00; G02C 11/02; G02C 5/00; G02C 5/122; G02C 5/143; G02C 5/2272; G02C 7/00; G02C 7/02
See application file for complete search history.

(56) References Cited

U.S. PATENT DOCUMENTS

| | | | |
|---|---|---|---|
| 1,508,043 A | 9/1924 | Barrows | |
| 4,119,984 A | 10/1978 | Zajac | |
| 4,936,667 A | 6/1990 | Röhr et al. | |
| 5,299,067 A | 3/1994 | Kutz et al. | |
| 5,365,670 A | 11/1994 | Klimochko | |
| 5,478,824 A | 12/1995 | Burns et al. | |
| 5,835,289 A | 11/1998 | Berry | |
| 6,480,339 B2 | 11/2002 | Clark | |
| 7,699,462 B2 | 4/2010 | Godoy | |
| 2002/0089752 A1* | 7/2002 | Morgan, III | G02B 23/14 359/600 |
| 2002/0105730 A1* | 8/2002 | Clark | G02B 23/14 359/675 |
| 2004/0212878 A1* | 10/2004 | Regan | G02B 7/04 359/402 |
| 2009/0240327 A1* | 9/2009 | Daxer | A61F 2/147 623/5.11 |

OTHER PUBLICATIONS http://web.archive.org/web/20100301194812/http:/www.kirkphoto.com/AquaTech-Soft-Hoods.html.*

* cited by examiner

*Primary Examiner* — Thomas K Pham
*Assistant Examiner* — Sharrief Broome
(74) *Attorney, Agent, or Firm* — Robert C. Montgomery; Montgomery Patent & Design LP.

(57) ABSTRACT

A corrective lens adapter configured for attaching to a firearm scope that comprises a lens adapted to compensate for presbyopic vision deficiencies of a user, a cylindrical body adapted to receive and support the lens, and a shroud adapted to be placed over a proximate end of the scope. The shroud is formed of a flexible material to be operatively fit over the eye piece of the scope without marring or damaging the scope, and includes a cord for cinching the shroud closed.

19 Claims, 3 Drawing Sheets

CORRECTIVE LENS ADAPTER FOR FIREARM SCOPE

RELATED APPLICATIONS

The present invention was first described in and claims the benefit of U.S. Provisional Application No. 61/891,150 filed Oct. 15, 2013, the entire disclosures of which are incorporated herein by reference.

FIELD OF THE INVENTION

The present invention relates generally to an adapter for a firearm scope including a corrective lens.

BACKGROUND OF THE INVENTION

Over the years, modern advances in hunting equipment have enhanced the sport, providing hunters with increased success. Among these products, optical scopes used on high-powered rifles, pistols, and even crossbows offers long-range targeting capabilities with pinpoint accuracy. However, many users of such scopes are afflicted by near vision problems forcing them to wear reading glasses. Such glasses are necessary to properly see through the scope, and view the reticle markings on the lenses. However, when the user looks down range at the object being shot at, the glasses need to be removed. This results in a continuous on again/off again cycle which is not only aggravating, but takes time in which the ideal shot can be missed. Accordingly, there exists a need for a means by which users requiring the use of reading glasses can be afforded the ability to effectively use a hunting scope, without the disadvantages as described above.

SUMMARY OF THE INVENTION

The disadvantages of the prior art are overcome by the present invention in providing a corrective lens adapter configured for attaching to a firearm scope that comprises a lens adapted to compensate for presbyopic vision deficiencies of a user, a cylindrical body adapted to receive and support the lens, and a shroud adapted to be placed over a proximate end of the scope. The shroud is formed of a flexible material to be operatively fit over the eye piece of the scope without marring or damaging the scope, and includes a cord for cinching the shroud closed. The use of the adapter provides presbyopic challenged, hunting scope users the ability to improve their hunting skill, in a manner which is quick, easy, and effective.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
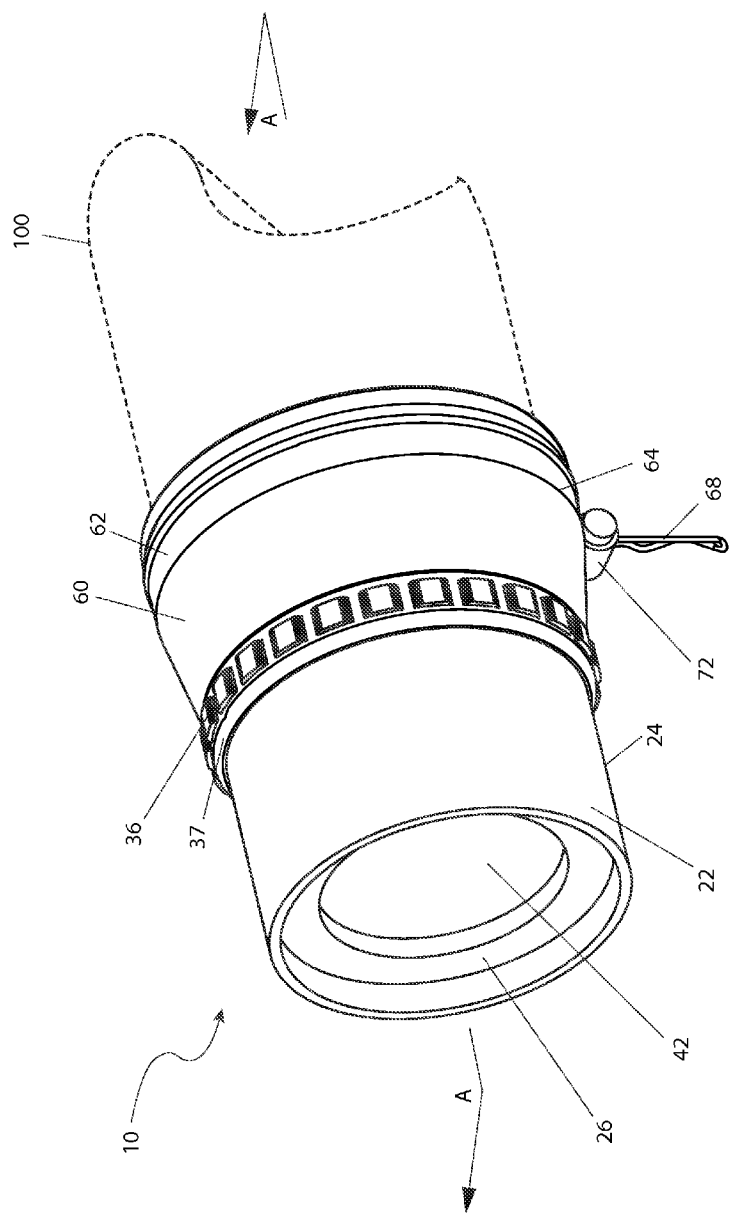
FIG. 1 is an isometric view of the corrective lens adapter 10 for a firearm scope in accordance with the preferred embodiment of the present invention.

DESCRIPTIVE KEY 10 corrective lens adapter
22 body
24 outer wall
26 lens wall
28 shoulder
32 internal thread
36 crimp band
37 offset wall
42 lens
52 ring
54 external thread
56 slot
60 shroud
62 hem
63 tunnel
64 stitching
65 hem opening
66 shroud opening
68 cord
72 cord retainer
100 scope

DETAILED DESCRIPTION OF THE PREFERRED EMBODIMENT

Figure 2:
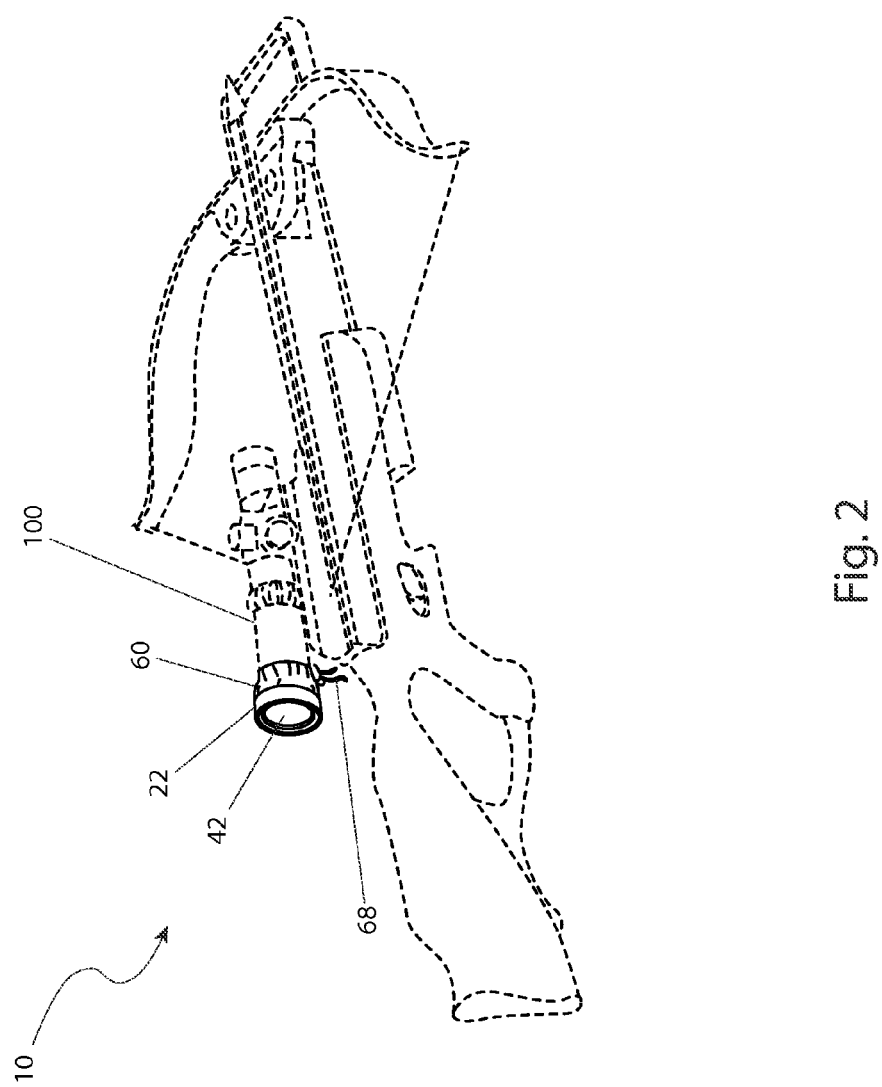
FIG. 2 is an isometric environmental view of a scope 100 of a crossbow fitted with a corrective lens adapter 10 for a firearm scope in accordance with the preferred embodiment of the present invention; and, FIG. 3 is a section view along a line A-A as shown on FIG. 1 of the corrective lens adapter 10 for a firearm scope in accordance with the preferred embodiment of the present invention.
Figure 3:
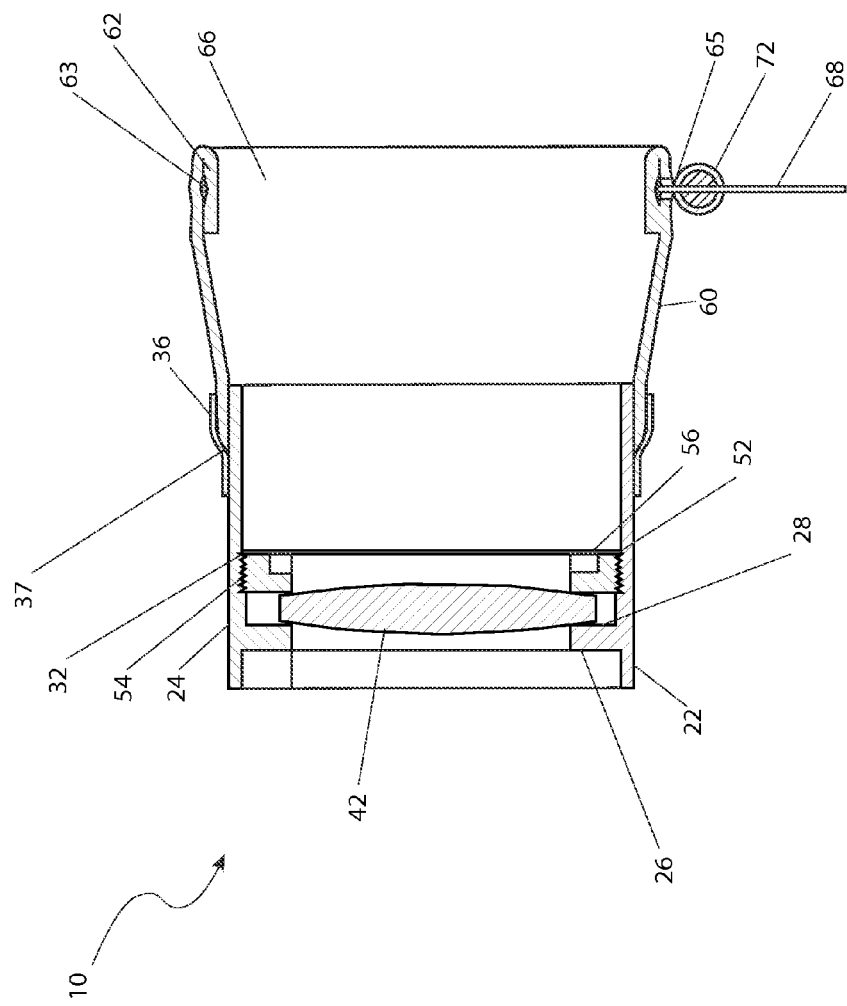

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope. The terms "a" and "an" herein do not denote a limitation of quantity, but rather denote the presence of at least one of the referenced items.

The present invention describes a corrective lens adapter for a firearm scope (herein referred to as the "apparatus") 10, which provides a means to fit a corrective lens 42 onto the proximal end of virtually any scope 100 of a crossbow weapon without the use of additional tools in order to compensate for the presbyopic vision deficiencies of the user. While this apparatus 10 was originally conceived to function with the scope 100 of a crossbow, it is understood that a broader use with other scopes 100 can be established without limiting the range of this invention.

Referring now to FIG. 1, an isometric view of the apparatus 10 according to the preferred embodiment of the present invention, is disclosed. The apparatus 10 has a body 22 comprised preferably of a thermoplastic material formed in an injection molding process. The body 22 is cylindrical with an outer wall 24 upon which is disposed a crimp band 36 for the purpose of retaining a shroud 60. The crimp band 36 is comprised of a metal, or a rigid thermoplastic material, formed with an annular ring cemented, or otherwise affixed to, the outer wall 24, an offset wall 37, and a second concentric annular ring constricting the textile shroud 60. The crimp band 36 may be formed with a plurality of uniformly spaced indentations, or crimps, for the purpose of creating an interference fit between the outer wall 24 and said crimp band 36 to positively grip and retain the material of the shroud 60.

The shroud 60 is a textile sleeve comprised of any of a variety of synthetic or natural fibers which encircles a distal end of the body 22. The shroud 60, as stated earlier, is affixed to the body 22 at one (1) end and is provided with a hem 62 at a second end. The hem 62 is formed at the shroud opening 66 by folding the material of the shroud 60 internally upon itself and affixing the end with stitching 64 as in a sewing process. Disposed in the hem 62, between the stitching 64 and the fold at the shroud opening 66 is an encircling tunnel 63, as seen in FIG. 3, through which a cord 68 is routed as a loop. A hem opening 65 is disposed in the tunnel 63 for the ingress and egress of the cord 68. A cord retainer 72 is placed onto the cord 68 at that point where said cord 68 enters and again exits the hem opening 65. The cord retainer 72 is a device which can maintain the relative positions of any two (2) points along the cord 68 such that said cord 68 can be placed in a constrictive loop. The cord retainer 72 is also provided with a release mechanism which will allow the cord 68 to pass freely so that the constriction can be lessened or removed. Currently, several mechanical devices exist which can serve the function of the cord retainer 72, and the specification of any one (1) such device will unnecessarily limit the range of the apparatus 10.

Referring now to FIG. 2, an isometric environmental view of the apparatus 10, attached to the scope 100 of a crossbow according to the preferred embodiment of the present invention, is disclosed. The shroud opening 66 is placed over a proximal end of a user's scope 100 and positioned such that the distal end of the body 22 comes into contact with said scope 100. The cord 68 is tightened within the hem 62 of the shroud 60 and the cord retainer 72 is placed at the hem opening 65 so that the constrictive loop of said cord 68 secures the position of the apparatus 10 on the scope 100.

Referring now to FIG. 3, a section view along line A-A, as shown in FIG. 1, of the apparatus 10 according to the preferred embodiment of the present invention, is disclosed. A lens wall 26 is disposed near the proximal end of the body 22. The lens wall 26 is a sectional divider with a circular aperture slightly smaller in diameter than the lens 42 so as to form a shoulder 28 against which said lens 42 is to be buttressed. The lens 42 is a ground and polished disc of glass, or translucent plastic, used to correct the presbyopic vision of a user. Due to the variability in the acuity of vision of the number of possible users, it must be understood that the refractive power of the lens 42, measured in diopter, may be different in different embodiments without limiting the range of the apparatus 10.

An internal thread 32, preferably of a unified national fine profile, is cut, or formed, on the interior of the outer wall 24 in proximity to the lens wall 26. The internal thread 32 in this location necessitates that the thickness of the outer wall 24 be greater in this region than in other portions of said outer wall 24 at a more distal location. A ring 52 comprised preferably of a rigid thermoplastic material and having an external thread 54 cut, or formed, on the outside diameter is engaged into the internal thread 32. Disposed in the distal side of the ring 52 is a plurality of radial slots 56. The slots 56 can be engaged symmetrically by a tool to rotate the ring 52 and cause a further engagement of the external thread 54 with the internal thread 34 thereby forcing said ring 52 against the lens 42 and securing said lens 42 in position.

The preferred embodiment of the present invention can be utilized in a simple and straightforward manner with little or no training. After initial purchase or acquisition of the apparatus 10, it would be installed as indicated in FIG. 2. The method of installing and utilizing the apparatus 10 may be achieved by performing the following steps: acquiring a model of the apparatus 10 having the desired refractive capability to adequately correct a user's vision impairment; disengaging the cord retainer 72 to loosen the cord 68; fitting the shroud opening 66 around the proximal end of the scope 100; positioning the distal end of the body 22 against the proximal end of the scope 100; tightening and cinching the cord 68 about the scope end using the cord retainer 72 so as to secure the apparatus 10 to the scope 100; and sighting through the scope to draw a bead on the prey.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A corrective lens adapter configured for removable attachment to a firearm scope, comprising:
    a cylindrical rigid body having a first end and an opposing second end, said body comprising:
        a continuous tubular outer wall defining an open interior space; and,
        an annular lens wall extending inwardly from an interior surface of said outer wall, proximate to said first end of said body;
    a locking ring positioned within said interior space of said outer wall, proximate to said annular lens wall, and threadably coupled to said interior surface of said outer wall;
    a corrective lens positioned within said interior space and fixed to said outer wall between said annular lens wall and said locking ring; and,
    a tubular shroud directly coupled to an exterior surface of said outer wall at said second end of said body and extending longitudinally away from said body, and wherein:
    said shroud is configured to be secured around a proximal end of said scope; and
    an end face of said outer wall at said second end of said body is configured to contact said proximal end of said scope.

2. The adapter of claim 1,
    wherein said ring is removable from said body to allow removal of said corrective lens from within said outer wall.

3. The adapter of claim 1, wherein said shroud is formed of a flexible material comprising a hem formed on a distal end of said shroud; and
    wherein said hem is adapted to be operatively fit over an eye piece of said scope without marring or damaging said eye piece.

4. The adapter of claim 3, wherein said hem of said shroud further comprises an encircling tunnel having a cord disposed therein; and
    wherein said cord is adapted to cinch said distal end of said shroud around said proximal end of said scope.

5. The adapter of claim 4, wherein said cord of said shroud further comprises a cord retainer; and
wherein said cord retainer holds said cord and said shroud in a cinched position.

6. The adapter of claim 1, wherein said body further comprises an annular crimp band configured to circumferentially clamp a proximal end of said shroud around said outer wall at said second end of said body.

7. The adapter of claim 6, wherein said crimp band further comprises a plurality of uniformly spaced indentations extending radially inward enabling an interference fit between said outer wall of said body at said second end and said crimp band to positively grip and retain said shroud to said body.

8. A corrective lens-adapted firearm scope, comprising:
a telescopic scope having a proximal end and a distal end opposite said proximal end;
a cylindrical rigid body coupled to said telescopic scope and having
a first end and
a second end opposite said first end, said body comprising:
a continuous tubular outer wall defining an open interior space, wherein an end face of said outer wall at said second end of said body contacts said proximal end of said telescopic scope; and,
an annular lens wall extending inwardly from an interior surface of said outer wall, proximate to said first end of said body;
a locking ring positioned within said interior space of said outer wall, proximate to said annular lens wall, and threadably coupled to said interior surface of said outer wall;
a corrective lens positioned within said interior space and fixed to said outer wall between said annular lens wall and said locking ring; and,
a tubular shroud directly coupled to an exterior surface of said outer wall at said second end of said body and extending longitudinally away from said body, wherein said shroud is secured around said proximal end of said telescopic scope.

9. The corrective lens-adapted firearm scope of claim 8, wherein said shroud is formed of a flexible material comprising a hem formed on a distal end of said shroud; and
wherein said hem fits over an eye piece of said telescopic scope without marring or damaging said eye piece.

10. The corrective lens-adapted firearm scope of claim 9, wherein said hem of said shroud further comprises an encircling tunnel having a cord disposed therein; and,
wherein said cord cinches said distal end of said shroud around said proximal end of said telescopic scope.

11. The corrective lens-adapted firearm scope of claim 10, wherein said cord of said shroud further comprises a cord retainer; and
wherein said cord retainer holds said cord and said shroud in a cinched position.

12. The corrective lens-adapted firearm scope of claim 8, wherein said body further comprises an annular crimp band circumferentially clamping a proximal end of said shroud around said outer wall at said second end of said body; and
wherein said crimp band comprises a plurality of uniformly spaced indentations extending radially inward enabling an interference fit between said outer wall of said body at said second end and said crimp band to positively grip and retain said shroud to said body.

13. A method of utilizing said corrective lens adapter of claim 1, said method comprising:
providing said corrective lens adapter;
fitting said shroud around said proximal end of said scope;
positioning said end face of said outer wall at said second end of said body against said proximal end of said scope; and,
tightening said shroud around said proximal end of said scope.

14. The method of claim 13, wherein said shroud comprises a cinching device that comprises a cord and cord retainer; and wherein said tightening said shroud around said proximal end of said scope comprises cinching said cinching device.

15. The method of claim 13, further comprising loosing said shroud from around said proximal end of said scope; and removing said body from contact with said proximal end of said scope.

16. The adapter of claim 1, wherein said corrective lens is configured to correct a vision deficiency.

17. The adapter of claim 16, wherein said vision deficiency is a presbyopic vision deficiency.

18. The corrective lens-adapted firearm scope of claim 8, wherein said corrective lens is configured to correct a vision deficiency.

19. The corrective lens-adapted firearm scope of claim 18, wherein said vision deficiency is a presbyopic vision deficiency.

* * * * *